United States Patent
Sasaki et al.

(10) Patent No.: US 12,503,597 B2
(45) Date of Patent: Dec. 23, 2025

(54) COMPOSITE MOLDED ARTICLE

(71) Applicant: JSP Corporation, Tokyo (JP)

(72) Inventors: Hidehiro Sasaki, Kaminokawa-machi (JP); Toshio Morita, Tochigi (JP)

(73) Assignee: JSP Corporation, Tokyo (JP)

( * ) Notice: Subject to any disclaimer, the term of this patent is extended or adjusted under 35 U.S.C. 154(b) by 808 days.

(21) Appl. No.: 17/797,648

(22) PCT Filed: Feb. 2, 2021

(86) PCT No.: PCT/JP2021/003653
§ 371 (c)(1),
(2) Date: Aug. 4, 2022

(87) PCT Pub. No.: WO2021/157548
PCT Pub. Date: Aug. 12, 2021

(65) Prior Publication Data
US 2023/0083244 A1    Mar. 16, 2023

(30) Foreign Application Priority Data

Feb. 6, 2020    (JP) .................................. 2020-018925

(51) Int. Cl.
| | | |
|---|---|---|
| *C08L 79/08* | (2006.01) |
| *C08J 9/32* | (2006.01) |
| *C08K 7/22* | (2006.01) |
| *C08L 63/00* | (2006.01) |
| *C08L 67/03* | (2006.01) |
| *C08L 79/04* | (2006.01) |

(52) U.S. Cl.
CPC ................. *C08L 79/08* (2013.01); *C08J 9/32* (2013.01); *C08K 7/22* (2013.01); *C08L 63/00* (2013.01); *C08L 67/03* (2013.01); *C08L 79/04* (2013.01); *C08L 2207/04* (2013.01)

(58) Field of Classification Search
CPC ......... C08L 63/00–10; C08J 9/32; C08K 7/22
See application file for complete search history.

(56) References Cited

U.S. PATENT DOCUMENTS

| | | | | |
|---|---|---|---|---|
| 2004/0266899 A1* | 12/2004 | Muenz | ................... | C08J 9/0061 521/135 |
| 2018/0162093 A1* | 6/2018 | Sasaki | .................... | B32B 15/16 |

FOREIGN PATENT DOCUMENTS

| | | |
|---|---|---|
| CN | 106661261 A | 5/2017 |
| JP | 2015-017190 A | 1/2015 |
| JP | 2015-047757 A | 3/2015 |
| JP | 2017-043011 A | 3/2017 |
| JP | 2017-061600 A | 3/2017 |
| JP | 2019-085517 A | 6/2019 |
| JP | 2019-181749 A | 10/2019 |

OTHER PUBLICATIONS

CNIPA; Application No. 202180012602.7; Office Action dated Mar. 23, 2023 and English translation submitted herewith, 14 pages.
International Search Report for PCT/JP2021/003653, mailed Apr. 6, 2021, and English Translation submitted herewith (5 pages).

* cited by examiner

*Primary Examiner* — Kregg T Brooks
(74) *Attorney, Agent, or Firm* — Fitch, Even, Tabin & Flannery LLP

(57) ABSTRACT

A composite molded article in which thermoplastic resin expanded beads are bonded via a thermosetting resin binder, wherein the composite molded article has a density of 0.05 to 0.5 g/cm$^3$, and when heated at 100° C. for 20 minutes, the composite molded article has a volume expansion rate of 15 to 200%.

9 Claims, No Drawings

COMPOSITE MOLDED ARTICLE

CROSS-REFERENCE TO RELATED APPLICATIONS

This application is a U.S. national phase application filed under 35 U.S.C. § 371 of International Application Number PCT/JP2021/003653, filed Feb. 2, 2021, designating the United States, which claims priority from Japanese Application Number 2020-018925, filed Feb. 6, 2020.

FIELD OF THE INVENTION

The present invention relates to a composite molded article and a laminate.

BACKGROUND OF THE INVENTION

Conventionally, foamed resins have been widely used as materials for weight reduction, heat insulating materials, cushioning materials, soundproofing materials, and the like. In addition, various studies have been made to improve the mechanical properties such as strength.

For example, PTL 1 discloses a composite molded article having specific physical properties, which is obtained by impregnating and curing a thermosetting resin raw material between a plurality of small resin foam pieces for a purpose of obtaining a composite molded article that is lightweight and shows high bending strength.

PTL 2 discloses a fiber-reinforced foam that shows excellent mechanical properties, which includes a thermoplastic resin foam, a binder resin, and a reinforcing fiber.

Further, attempts have also been made to obtain a molded article having improved physical properties such as strength while utilizing the characteristics of foamed resins by forming a laminate, such as a sandwich panel, of the foamed resins and other materials.

For example, PTL 3 discloses, as an efficient method of producing a composite having excellent mechanical strength, impact absorption, and lightness, a method of producing a fiber-reinforced composite including heating a forming material containing a reinforcing fiber impregnated with a synthetic resin, disposing expanded beads on the forming material, and temporarily molding the forming material along a mold.

CITATION LIST

Patent Literature

PTL 1: JP 2015-017190 A
PTL 2: JP 2017-061600 A
PTL 3: JP 2015-047757 A

SUMMARY OF INVENTION

However, in a conventional foamed resin laminate, when a foamed resin as a core material and a sheet material as a surface material or the like are bonded, it has been necessary to press to bond the foamed resin and the sheet material. When the dimensions of the core material deviate slightly from the dimensions of the mold or the sheet material is deformed, it becomes difficult to uniformly apply pressing force to the laminated surface of the foamed resin and the sheet material. As a result, there have been problems that a part of the sheet material is easily peeled off from the foamed resin and it is difficult to obtain a laminate having the same dimensions as the mold.

Therefore, an object to be solved by the present invention is to provide a composite molded article having an excellent bonding property to other materials such as a sheet material, and a laminate composed of the composite molded article and the sheet material.

The present invention provides <1> to <11> described below.

<1> A composite molded article in which thermoplastic resin expanded beads are bonded via a thermosetting resin binder, wherein the composite molded article has a density of 0.05 to 0.5 g/cm$^3$, and when heated at 100° C. for 20 minutes, the composite molded article has a volume expansion rate of 15 to 200%.

<2> The composite molded article according to <1>, wherein the thermosetting resin binder contains a thermosetting resin (a) in an uncured state and a thermosetting resin (b) in a cured state.

<3> The composite molded article according to <2>, wherein the thermosetting resin (a) in an uncured state of the thermosetting resin binder contains an epoxy compound and an imidazole compound.

<4> The composite molded article according to <2> or <3>, wherein the thermosetting resin (b) in a cured state of the thermosetting resin binder contains a reaction product of an epoxy compound and an amine compound.

<5> The composite molded article according to any one of <2> to <4>, wherein a mass ratio (a/b) of the thermosetting resin (a) in an uncured state of the thermosetting resin binder to the thermosetting resin (b) in a cured state of the thermosetting resin binder is 0.03 to 2.

<6> The composite molded article according to any one of <1> to <5>, wherein a reinforcing fiber is further blended with the thermosetting resin binder.

<7> The composite molded article according to any one of <1> to <6>, wherein the thermosetting resin binder of the composite molded article has a content of 15 to 70% by mass.

<8> The composite molded article according to any one of <1> to <7>, wherein a thermoplastic resin constituting the expanded beads is an aliphatic polyester-based resin.

<9> The composite molded article according to any one of <1> to <8>, wherein, of the volume expansion rate of the composite molded article when heated at 100° C. for 20 minutes, an expansion rate in a uniaxial direction is 50% or more of a total expansion rate.

<10> A laminate obtained by laminating the composite molded article according to any one of <1> to <9> and a sheet material, and curing the thermosetting resin binder.

<11> The laminate according to <10>, wherein the sheet material is a resin sheet composed of a thermoplastic resin.

The composite molded article of the present invention is a composite molded article in which thermoplastic resin expanded beads are bonded via a thermosetting resin binder. Since the composite molded article has a specific density and a volume expansion rate, it is possible to expand the composite molded article with a specific expansion force when heated. When obtaining a laminate, the composite molded article having such characteristics expands uniformly regardless of the shape of a mold and can be bonded to a sheet material with a uniform pressing force, and thus the obtained laminate has an excellent bonding property.

DESCRIPTION OF EMBODIMENTS

[Composite Molded Article]

The composite molded article of the present invention is a composite molded article in which thermoplastic resin expanded beads are bonded via a thermosetting resin binder, wherein the composite molded article has a density of 0.05 to 0.5 g/cm³, and when heated at 100° C. for 20 minutes, the composite molded article has a volume expansion rate of 15 to 200%. Examples of the composite molded article of the present invention include a press-molded article.

<Composition and Characteristics of Composite Molded Article>

The composite molded article of the present invention is a composite molded article in which thermoplastic resin expanded beads are bonded to each other via a thermosetting resin binder, and when heated at 100° C. for 20 minutes, the composite molded article has a volume expansion rate of 15 to 200%. On the other hand, when not heated, the composite molded article has characteristics of maintaining its density at 0.05 to 0.5 g/cm³.

A suitable composite molded article in the present invention is a composite molded article that can exert a specific expansion force because the shape of the composite molded article is maintained in a compressed state and the compressed state is released at the time of heating by a method or the like described later.

The density of the composite molded article of the present invention is 0.05 to 0.5 g/cm³. The lower limit of the density of the composite molded article of the present invention is preferably 0.05 g/cm³, more preferably 0.06 g/cm³, and even more preferably 0.07 g/cm³, and on the other hand, the upper limit of the density of the composite molded article of the present invention is preferably 0.3 g/cm³, more preferably 0.2 g/cm³, and even more preferably 0.1 g/cm³.

The density can be obtained by the external dimensions of the composite molded article or a submersion method in a standard state. The density of the composite molded article is a density when the composite molded article is in a compressed state.

When the density of the composite molded article is within the above range the composite molded article is in a specific compressed state, and thus the composite molded article has an expansion force at the time of heating. In addition, the composite molded article is lightweight. Then, after the composite molded article is completely cured, it becomes a molded article having further excellent strength.

The volume expansion rate of the composite molded article of the present invention when heated at 100° C. for 20 minutes is 15 to 200%. The lower limit of the volume expansion rate when the composite molded article is heated at 100° C. for 20 minutes is preferably 18%, more preferably 20%, and even more preferably 50%, and on the other hand, the upper limit of the volume expansion rate when the composite molded article is heated at 100° C. for 20 minutes is preferably 150%, more preferably 100%, and even more preferably 80%. The volume expansion rate of the composite molded article is a ratio of the volume increased after heating with respect to the volume before heating. The composite molded article of the present invention has the aforementioned expansion rate because the shape is maintained in the compressed state and the compressed state is released at the time of heating to exert a specific expansion force.

When the expansion rate of the composite molded article is within the above range, the composite molded article can be easily installed in a mold when obtaining a laminate with a sheet material, and the composite molded article and the sheet material are easily bonded to each other when the composite molded article is expanded. As a result, it is possible to obtain a laminate having excellent bonding property between the composite molded article and the sheet material. Further, simply by filling a mold having a desired shape with the composite molded article and heating the mold, it is possible to laminate the sheet material and the composite molded article, cure the thermosetting resin binder, and bond the sheet material and the composite molded article. Therefore, a laminate can be easily obtained without using a complicated molding machine such as a press machine.

The adjustment of the expansion rate depends on the compression rate when forming the composite molded article. Therefore, it is preferable to adjust the compression rate when forming the composite molded article to adjust the expansion rate of the composite molded article within the above range.

Specifically, the volume expansion rate is a value obtained by measuring the volume of the composite molded article before heating and the volume of the composite molded article after heating by the external dimensions or the submersion method, dividing the volume of the composite molded article after heating by the volume of the composite molded article before heating and expressing the result as a percentage, and subtracting 100.

Further, it is preferable that the expansion rate in a specific uniaxial direction when the composite molded article of the present invention is heated at 100° C. for 20 minutes is larger than the expansion rate in other directions.

Specifically, the lower limit of the expansion rate in the specific uniaxial direction is preferably 10%, more preferably 12%, further more preferably 15%, and still further more preferably 30%, and on the other hand, the upper limit of the expansion rate in the specific uniaxial direction is preferably 150%, more preferably 100%, further more preferably 80%, and still further more preferably 60%.

The expansion rate in the uniaxial direction referred to here is a value obtained by dividing the total length of the composite molded article in a specific uniaxial direction after heating by the total length of the composite molded article in the same uniaxial direction before heating and expressing the result as a percentage, and subtracting 100. The total length of the composite molded article in the uniaxial direction refers to the length of the longest portion of the composite molded article in the uniaxial direction, and in the present specification, the total length of the composite molded article after heating when determining the expansion rate refers to the length after heating measured for the same portion as the portion where the total length of the composite molded article before heating was measured.

When the molded article is a plate, or a rectangular parallelepiped, a substantially rectangular parallelepiped, a cube, or a substantially cubic body, the specific uniaxial direction is preferably a direction perpendicular to a plane having the largest area (Z-axis direction, thickness direction).

In particular, by controlling the expansion rate in the specific uniaxial direction to be increased toward a direction perpendicular to an adhesive surface of a sandwich panel-like laminate having the sheet material on one side or both sides, the laminate can be efficiently bonded.

In addition, it is preferable to adjust the expansion rate in the uniaxial direction by controlling the compression direction such that the compression direction of the composite molded article is a direction parallel to the uniaxial direction.

Further, the expansion rate in the uniaxial direction is preferably 50% or more, more preferably 70% or more, and even more preferably 90% or more of the total expansion rate, and the expansion rate in the uniaxial direction being 50% or more of the total expansion rate means that the percentage of the value obtained by dividing the expansion rate in the uniaxial direction by the volume expansion rate of the composite molded article is 50% or more.

The composite molded article of the present invention is preferably a plate-shaped molded article from the viewpoint of efficiently obtaining a laminate. The plate-shaped molded article may have unevenness on its surface. The lower limit of the expansion rate in the thickness direction of the plate-shaped molded article when heated at 100° C. for 20 minutes is preferably 10%, more preferably 20%, and on the other hand, the upper limit of the expansion rate in the thickness direction of the plate-shaped molded article when heated at 100° C. for 20 minutes is preferably 150%, more preferably 100%.

The expansion rate in the thickness direction referred to here is a value obtained by dividing the total length in the thickness direction of the composite molded article after heating by the total length in the thickness direction of the composite molded article before heating and expressing the result as a percentage, and subtracting 100.

In the case of the plate-shaped molded article, it is preferable that the expansion rate in the thickness direction is the expansion rate in the uniaxial direction.

The voidage of the composite molded article of the present invention is preferably 40% by volume or lower. Further, the lower limit of the voidage is preferably 0.1% by volume, more preferably 1% by volume, and the upper limit of the voidage is preferably 40% by volume, more preferably 30% by volume. When the voidage of the composite molded article is within the above range, it is possible to easily form a composite molded article having an excellent expansion rate and capable of achieving the above mentioned expansion rate.

<Thermosetting Resin Binder>

In the composite molded article of the present invention, the thermoplastic resin expanded beads are bonded via a thermosetting resin binder. Further, it is preferable that the thermosetting resin binder contains a thermosetting resin (a) in an uncured state and a thermosetting resin (b) in a cured state.

A suitable composite molded article in the present invention is a composite molded article that can exert a specific expansion force because the shape of the composite molded article is maintained in a compressed state and the compressed state is released at the time of heating by a method or the like described later. Further, it is considered that as the thermosetting resin binder contains the thermosetting resin (a) in an uncured state and the thermosetting resin (b) in a cured state, the effect of the present invention can be enhanced as follows.

That is, when not heated, the thermosetting resin binder contains the thermosetting resin (b) in a cured state and the thermosetting resin (a) in an uncured state, and the fluidity of the thermosetting resin (a) in an uncured state decreases. As a result, it is possible to confine the expansion force in the composite molded article and maintain the shape in the compressed state. On the other hand, since the thermosetting resin binder contains the thermosetting resin (a) in an uncured state, it is considered that, when heated to a high temperature of about 100° C., the fluidity can be exhibited and the composite molded article can expand at a high expansion rate.

The lower limit of the content of the thermosetting resin binder in the composite molded article is preferably 10% by mass, more preferably 12% by mass, further more preferably 13% by mass, and still further more preferably 15% by mass, and the upper limit of the content of the thermosetting resin binder in the composite molded article is preferably 70% by mass, more preferably 60% by mass, further more preferably 50% by mass, and still further more preferably 30% by mass.

When the content of the thermosetting resin binder is within the above range, the shape in the compressed state can be maintained in a low temperature state, and the expansion force can be exerted in a high temperature state. As a result, there is an excellent balance between the maintenance of the compressed state and the expansion rate.

(Thermosetting Resin)

Examples of the thermosetting resin constituting the thermosetting resin binder include an epoxy-based resin, an unsaturated polyester-based resin, a vinyl ester-based resin, a phenol-based resin, a polyamide-based resin, a urea-based resin, a melamine-based resin, a polyimide-based resin, a diallyl phthalate-based resin, and an urethane-based resin. Among these, from the viewpoint of an excellent bonding property with a thermoplastic resin constituting expanded beads, the thermosetting resin is preferably one or a combination of two or more of an epoxy-based resin and an unsaturated polyester-based resin, and more preferably an epoxy-based resin.

(Composition and Characteristics of Thermosetting Resin Binder)

The thermosetting resin binder constituting the composite molded article of the present invention preferably contains a thermosetting resin (a) in an uncured state and a thermosetting resin (b) in a cured state.

The uncured state of the thermosetting resin includes, in the standard state, not only a state in which curing of the thermosetting resin has not been progressed, but also a state in which curing has started to progress but the curing is not completed (a semi-cured state).

Such a form in which the thermosetting resin binder is in a substantially uncured state and shows a solid state or a semi-solid state at room temperature is generally called "B stage".

When the thermosetting resin binder contains the thermosetting resin (a) in an uncured state, the fluidity of the thermosetting resin (a) in an uncured state is reduced when not heated, and the composite molded article is capable of maintaining a specific compressed state. On the other hand, when heated, the fluidity of the thermosetting resin (a) in an uncured state is exhibited, and the composite molded article has a high expansion force.

The determination on whether the thermosetting resin is in a cured state or an uncured state is performed in accordance with the heat flux differential scanning calorimetry method described in JIS K7122-1987, and when a curing heat generation peak of the thermosetting resin is observed, it is determined that the thermosetting resin is in an uncured state. The curing heat generation peak of the thermosetting resin is preferably observed at 110 to 180° C., more preferably observed at 120 to 170° C. In addition, the calorific value of the curing heat generation peak is preferably 3 J/g or more, more preferably 5 J/g or more.

On the other hand, since the thermosetting resin binder contains the thermosetting resin in a cured state, voids between the expanded beads and the expanded beads can be efficiently maintained in a compressed state in the process of forming the composite molded article.

Examples of a method of obtaining such a thermosetting resin binder containing a thermosetting resin (a) in an uncured state and a thermosetting resin (b) in a cured state include a method of allowing a plurality of thermosetting resins having different reactivity to be present and curing only highly reactive components, a method of controlling the curing reaction of a thermosetting resin to cure only a part thereof, and a method of allowing a plurality of curing agents having different reactivity to be present. From the viewpoint of obtaining a homogeneous binder, it is preferable to use a method of allowing a plurality of curing agents having different reactivity to be present.

The lower limit of the mass ratio (a/b) of the thermosetting resin (a) in an uncured state of the thermosetting resin binder to the thermosetting resin (b) in a cured state of the thermosetting resin binder is preferably 0.03, more preferably 0.05, further more preferably 0.1, and still further more preferably 0.2, and the upper limit of the mass ratio (a/b) is preferably 2, more preferably 1, further more preferably 0.7, and still further more preferably 0.5. As a specific method of measuring a mass ratio, it is possible to calculate by the ratio of calorific value of the curing heat generation peak by carrying out a method of determining whether the thermosetting resin is in a cured state or an uncured state with respect to three kinds of samples, the raw material of a composite molded article (a mixture of expanded beads), the composite molded article, and the composite molded article which has been completely cured by heating. Further, the mass ratio can be calculated by back calculation from the expansion rate by a calibration curve method or the like.

For example, when a curing agent is used in the thermosetting resin binder, the addition amount of the curing agent is preferably 1 part by mass or more, more preferably 3 parts by mass or more, further more preferably 3 parts by mass or more, and is preferably 25 parts by mass or less, more preferably 18 parts by mass or less, and further more preferably 15 parts by mass or less, based on 100 parts by mass of the thermosetting resin. Further, the amount of the thermosetting resin in a cured state can be adjusted by the addition amount of the curing agent.

Moreover, when the amount of the thermosetting resin (a) in an uncured state and the thermosetting resin (b) in a cured state are adjusted by using a plurality of curing agents having different reactivity, the lower limit of the mass ratio between a curing agent having high reactivity and a curing agent having low reactivity (highly reactive curing agent/lowly reactive curing agent) is preferably 0.03, more preferably 0.05, further more preferably 0.1, and still further more preferably 0.2, and the upper limit of the mass ratio (highly reactive curing agent/lowly reactive curing agent) is preferably 2, more preferably 1, further more preferably 0.7, and still further more preferably 0.5.

Examples of the highly reactive curing agent include a curing agent having a curing temperature of 80° C. or lower, and more preferably a curing agent having a curing temperature of 70° C. or lower.

As described above, the thermosetting resin constituting the thermosetting resin binder suitably used in the composite molded article of the present invention is preferably an epoxy resin. When an epoxy resin is used as the thermosetting resin, it is preferable that the thermosetting resin (a) in an uncured state of the thermosetting resin binder contains an epoxy compound and an imidazole compound. Further, it is preferable that the thermosetting resin (b) in a cured state of the thermosetting resin binder contains a reaction product of an epoxy compound and an amine compound.

Moreover, it is more preferable that the thermosetting resin (a) in an uncured state of the thermosetting resin binder contains an epoxy compound and an imidazole compound, and the thermosetting resin (b) in a cured state of the thermosetting resin binder contains a reaction product of an epoxy compound and an amine compound.

Hereinafter, a thermosetting resin binder containing an epoxy resin, which is a suitable thermosetting resin, will be described.

(Thermosetting Resin (b) in a Cured State of Thermosetting Resin Binder)

In the present invention, the thermosetting resin binder preferably contains a reaction product of an epoxy compound and an amine compound as the thermosetting resin (b) in a cured state. The reaction product of an epoxy compound and an amine compound uses the epoxy compound and the amine compound as raw materials. Then, when the composite molded article is compressed and molded, the shape of the composite molded article in a compressed state can be maintained by molding under a condition that the epoxy compound and the amine compound react with each other.

In this way, in the thermosetting resin binder containing the epoxy resin, the amine compound functions as the aforementioned highly reactive curing agent.

Since the reaction of the epoxy compound and the amine compound constituting the thermosetting resin (b) in a cured state proceeds at a relatively low temperature, the compressed state can be maintained more effectively.

Examples of the epoxy compound constituting the thermosetting resin (b) in a cured state of the thermosetting resin binder include a bisphenol-type epoxy-based resin such as a bisphenol A-type epoxy resin, a bisphenol F-type epoxy resin, and a bisphenol S-type epoxy resin; a novolac-type epoxy-based resin such as a phenol novolac-type epoxy resin and a cresol novolac-type epoxy resin; an alicyclic epoxy-based resin; a glycidyl ether-type epoxy-based resin; a glycidylated amine-type epoxy-based resin; a halogenated epoxy-based resin; or an addition polymer of an epoxy group-containing monomer or oligomer such as glycidylated polyester, glycidylated polyurethane, and glycidylated acryl. These epoxy-based resins may be used alone or in combination of two or more thereof.

On the other hand, examples of the amine compound constituting the thermosetting resin (b) in a cured state of the thermosetting resin binder include a polyamine compound, an aliphatic amine having an aromatic ring, and an aromatic amine.

Examples of the polyamine compound include a chain aliphatic polyamine and a cyclic aliphatic polyamine.

Examples of the chain aliphatic polyamine include diethylenetriamine, triethylenetetraamine, tetraethylenepentamine, dipropylenediamine, diethylaminopropylamine, and AMINE248. Examples of the cyclic aliphatic polyamine include N-aminoethylpiperazine, mensendiamine, and 1,3-bis (aminomethyl) cyclohexane.

Examples of the aliphatic amine having an aromatic ring include a xylylenediamine derivative. Examples of the aromatic amine include meta-phenylenediamine, diaminodiphenylmethane, and diaminodiphenyl sulfone.

These amine compounds can be used alone or in combination of two or more.

In addition, among these, the polyamine compound is preferable and the alicyclic polyamine compound is more preferable from the viewpoint of performing a curing reaction at a relatively low temperature.

(Thermosetting Resin (a) in an Uncured State of Thermosetting Resin Binder)

In the present invention, the thermosetting resin binder preferably contains an epoxy compound and an imidazole compound as the thermosetting resin (a) in an uncured state. When the thermosetting resin binder contains an epoxy compound and an imidazole compound in an uncured state as described above, these compounds may exist in an uncured state with reduced fluidity in a composite molded article formed by compression molding.

Then, in a heating step when obtaining a laminate with a sheet material, the thermosetting resin (a) in an uncured state maintains its fluidity until the expansion is completed, and then the thermosetting resin (a) is completely cured by a subsequent bonding step with the sheet material, thereby a laminate can be obtained. From the above viewpoint, it is preferable that the thermosetting resin (a) in an uncured state exists in a state with reduced fluidity at a temperature of or lower than the temperature of the compression molding step. Further, during heating in a laminating step of the sheet material, it is preferable that the thermosetting resin (a) in an uncured state changes from a state with reduced fluidity to a fluid state, and after the bonding of the sheet material, the thermosetting resin (a) is in a completely cured state.

As an epoxy compound constituting the thermosetting resin (a) in an uncured state of the thermosetting resin binder, the same epoxy compound as the epoxy compound constituting the thermosetting resin (b) in a cured state can be used.

On the other hand, examples of the imidazole compound include 2-methylimidazole, 1,2-dimethylimidazole, 1-benzyl-2-methylimidazole, 1-cyanoethyl-2-phenylimidazolium trimellitate, 2-phenylimidazoline, 2-undecylimidazole, 2-heptadecylimidazole, 1,2-trimethylenebenzimidazole, 1-dodecyl-2-methyl-3-benzylimidazolium chloride, 2-phenylimidazole, 2-phenyl-4,5-dihydroxymethylimidazole, 2-phenyl-4-methyl-5-hydroxymethylimidazole, 2,4-diamino-6-[2'-methylimidazolyl-(1')]-ethyl-s-triazine, 2-ethyl-4-methylimidazole, and 2,4-diamino-6-[2'-methylimidazolyl-(1')]-ethyl-s-triazine isocyanuric acid addition salt.

That is, when an epoxy resin is used as the thermosetting resin, it is preferable that, in the thermosetting resin binder of the composite molded article, a reaction product of an epoxy compound and an amine compound exists as the thermosetting resin (b) in a cured state, and a mixture of an epoxy compound and an imidazole compound exists as the thermosetting resin (a) in an uncured state.

The lower limit of the blending ratio of the total mass of the epoxy compound and the amine compound in the thermosetting resin binder to the total mass of the epoxy compound and the imidazole compound in the thermosetting resin binder is preferably 0.03, more preferably 0.05, further more preferably 0.1, and still further more preferably 0.2, and the upper limit of the blending ratio is preferably 2, more preferably 1, further more preferably 0.7, and still further more preferably 0.5.

The lower limit of the mass ratio of the amine compound and the imidazole compound in the raw materials of the thermosetting resin binder (amine compound/imidazole compound) is preferably 0.03, more preferably 0.05, further more preferably 0.1, and still further more preferably 0.2, and the upper limit of the mass ratio (amine compound/imidazole compound) is preferably 2, more preferably 1, further more preferably 0.7, and still further more preferably 0.5.

(Inorganic Filler, Etc.)

The thermosetting resin may contain an inorganic filler in addition to reinforcing fibers. Examples of the inorganic filler include a glass powder, or those generally called inorganic fillers such as silica, alumina, titanium oxide, iron oxide, zinc oxide, magnesium oxide, antimony oxide, barium ferrite, strontium ferrite, beryllium oxide, pumice, talc, kaolin, mica, sericite, borax, aluminum hydroxide, magnesium hydroxide, aluminum carbonate, calcium carbonate, barium sulfate, ammonium sulfate, calcium sulfite, and a combination of two or more thereof. Among these, silica and magnesium oxide are preferable.

These inorganic fillers are mixed in an amount of preferably 5 parts by mass or more, more preferably 10 parts by mass or more, and is preferably 150 parts by mass or less, more preferably 100 parts by mass or less, based on 100 parts by mass of the thermosetting resin. It is preferable to sufficiently disperse these inorganic fillers in an uncured thermosetting resin liquid raw material.

The thermosetting resin binder may contain a modifier such as an extender, a colorant, an ultraviolet absorber, an antioxidant, a flame retardant, an antifungal agent, a plasticizer, a coupling agent, an electrically conductive filler, a magnetic filler, a thermally conductive filler, an antistatic agent, and elastic fine particles, as necessary within a range in which an object of the present invention is not impaired. In particular, it is preferable to contain a flame retardant in order to obtain flame retardancy.

<Reinforcing Fiber>

It is preferable that the composite molded article of the present invention contains reinforcing fibers, and it is more preferable that the reinforcing fibers are blended in the thermosetting resin binder. That is, it is preferable that the composite molded article of the present invention contains reinforcing fibers, and the reinforcing fibers are present in the thermosetting resin binder.

Examples of the reinforcing fiber include a glass fiber, a carbon fiber, a vinylon fiber, a polyester fiber, a ceramics fiber, a steel fiber, a stainless (SUS) fiber, an aluminum fiber, a boron fiber, and a combination of two or more thereof. Among these, from the viewpoint of high strength, versatility, economic efficiency, and the like, a glass fiber, a carbon fiber, and a vinylon fiber are preferable, and a glass fiber and a carbon fiber are more preferable.

The mass ratio of the thermosetting resin to the reinforcing fibers in the thermosetting resin binder (thermosetting resin/reinforcing fibers) is preferably 5/95 to 95/5. From the viewpoint of balancing the strength of the thermosetting resin and the expansion rate of the composite molded article, the lower limit of the mass ratio is preferably 30/70, more preferably 50/50, and the upper limit of the mass ratio is preferably 85/15, more preferably 75/25.

An average length (L) of the reinforcing fiber is preferably 0.05 mm or more and 1 mm or less. Within the above range, entanglement of fibers is likely to occur, and thus the impact resistance performance is improved, and uniform dispersion of fibers becomes easier.

The ratio (L/D) of the fiber length (L) to the fiber diameter (D) in the reinforcing fibers is preferably 2 or more, more preferably 5 or more, and further more preferably 10 or more, and the upper limit thereof is preferably 100 or less. Within the above range, the improvement effect of mechanical properties is increased, and it is possible to form a composite molded article which is particularly excellent in the impact resistance.

Also, the fiber length (L) and the fiber diameter (D) of the reinforcing fiber can be measured by observation with an electron microscope. Also, the fiber length (L) and the fiber diameter (D) are calculated by setting a parameter as an average value to 500 or more.

In addition, when the reinforcing fiber is contained, it is preferable that a dispersant is contained in the composite molded article and is present in the thermosetting resin binder in order to improve the wettability between the reinforcing fiber and the thermosetting resin. As the dispersant, an alkylammonium salt of a high molecular weight copolymer can be suitably used. The dispersant is preferably contained in an amount of 0.1 parts by mass or more, more preferably 0.2 parts by mass or more, based on 100 parts by mass of the thermosetting resin contained in the thermosetting resin binder, and it is preferably contained in an amount of 5 parts by mass or less, and more preferably contained in an amount of 3 parts by mass or less.

<Thermoplastic Resin Expanded Beads>

Examples of a thermoplastic resin constituting the thermoplastic resin expanded beads in the composite molded article of the present invention include a polyester-based resin, a polycarbonate-based resin, an acrylic-based resin, a polyphenylene ether-based resin, a polymethacrylimide resin, a polyolefin-based resin, a polystyrene-based resin, and a polyamide-based resin. The thermoplastic resin may be used alone or in combination of two or more thereof. Among the thermoplastic resins, a polyolefin-based resin and a polyester-based resin are preferable, and a polyester-based resin is more preferable.

As for the polyester-based resin, a linear polyester obtained through polycondensation of dicarboxylic acid and dihydric alcohol may be generally employed. Examples of the polyester-based resin include an aromatic polyester-based resin and an aliphatic polyester-based resin, and an aliphatic polyester-based resin is preferable.

The aromatic polyester-based resin is a polyester containing an aromatic dicarboxylic acid component and a diol component. Examples of the aromatic polyester-based resin include polyethylene terephthalate, polypropylene terephthalate, polybutylene terephthalate, polycyclohexanedimethylene terephthalate, polyethylene naphthalate, and polybutylene naphthalate.

The aliphatic polyester-based resin is one containing aliphatic ester as a main component in the main chain. The content ratio of the aliphatic ester in the main chain is at least 60 mol %, preferably 80 mol % or more, and more preferably 90 mol % or more, and is preferably 100 mol % or less. The aliphatic polyester-based resin includes a hydroxy acid polycondensate, a ring-opened polymer of lactone, a polycondensate of a polyhydric alcohol component and a polycarboxylic acid component, and the like. Examples of the hydroxy acid polycondensate include polylactic acid, and a polycondensate of hydroxybutyric acid. Examples of the ring-opened polymer of lactone include polycaprolactone and polypropiolactone. Examples of the polycondensate of the polyhydric alcohol component and the polycarboxylic acid component include polybutylene succinate, polybutylene adipate, and polyethylene succinate. Among these, from the viewpoint of preventing a volume reduction of expanded beads due to heat generation during curing of the thermosetting resin, a polylactic acid-based resin is preferable.

The polylactic acid-based resin preferably has crystallinity. Since the polylactic acid-based resin has crystallinity, during production of the composite molded article, it is possible to prevent and suppress a volume reduction of expanded beads, an occurrence of a gap at the interface with a thermosetting resin due to thermal contraction of the expanded beads, or an occurrence of a sink mark on the composite molded article and the laminate.

A method of obtaining polylactic acid-based resin-expanded beads having a high degree of crystallinity is not particularly limited. Examples thereof may include a method of promoting crystallization of a polylactic acid-based resin by performing heat treatment in a foaming step, and obtaining expanded beads, and a method of subjecting expanded beads to heat treatment under the atmosphere of 65° C. or higher, and the temperature at which the expanded beads are subjected to the heat treatment is preferably 66° C. or higher, more preferably 67° C. or higher, and is preferably 80° C. or lower, more preferably 75° C. or lower. Also, the heat treatment time is preferably 8 hours or more.

Also, it is preferable that the polyolefin-based resin is a resin containing 50% by mass or more of an olefin component. Specific examples thereof include a polyethylene-based resin and a polypropylene-based resin. These may be used alone or as a mixture of two or more thereof.

At least one of a glass transition temperature and a melting temperature of the thermoplastic resin constituting the thermoplastic resin expanded beads is preferably 60° C. or higher, more preferably 100° C. or higher, and further more preferably 120° C. or higher from the viewpoint of heat resistance of the composite molded article and the laminate, and is preferably 400° C. or lower, more preferably 200° C. or lower, and further more preferably 180° C. or lower from the viewpoint of productivity of thermoplastic expanded beads.

The glass transition temperature of the thermoplastic resin constituting the thermoplastic resin expanded beads may be found as a midpoint glass transition temperature of a DSC curve obtained by heat flux differential scanning calorimetry in accordance with JIS K7121-1987 without defoaming the thermoplastic resin expanded beads. Also, as for a test piece, it uses a test piece for finding the glass transition temperature which has been subjected to condition adjustment in accordance with "when a glass transition temperature is measured after a certain heat treatment is performed" described in "3. condition adjustment of test piece (3)" of JIS K7121-1987 by being placed in a container of a DSC device, heated and dissolved by a temperature rise up to 200° C. at a rate of 10° C./min, and immediately cooled to 0° C. at a rate of 10° C./min.

The measurement of the melting temperature of the thermoplastic resin constituting the thermoplastic resin expanded beads is a value measured by heat flux differential scanning calorimetry in accordance with JIS K7121-1987 without defoaming the thermoplastic resin expanded beads. Specifically, a test piece whose condition has been adjusted by the condition of "3. condition adjustment of test piece (2)" of JIS K7121-1987 (provided that the cooling rate is 10° C./min) is used to obtain a melting temperature peak by a temperature rise of the test piece at a rate of 10° C./min, and the temperature at the apex of the obtained melting peak is used as the melting point. However, when two or more melting peaks occur, the temperature at the apex of a melting peak having the largest area is used as the melting point.

Examples of the thermoplastic resin expanded beads include pulverized matters of foamed strands, foamed molded articles, and extruded foams, and the like, as well as expanded beads obtained from resin particles. Also, as for the expanded beads, tubular expanded beads having voids forming through-holes in the expanded beads, which are described in JP-A-08-108441, etc., may be used. Also, when the tubular expanded beads are used, a thermosetting resin adheres to at least the outer surface side of the expanded beads.

Also, as the shape of the resin particles, columnar, spherical, prismatic, elliptical spherical, cylindrical shapes, etc. may be employed. The expanded beads obtained by foaming these resin particles become expanded beads having a shape substantially corresponding to the shape of the resin particles prior to foaming, and expanded beads having a shape corresponding to the above-mentioned columnar, spherical, prismatic, elliptical spherical, cylindrical shapes, etc.

The bead size of the expanded beads is preferably 1 mm or more, more preferably 2 mm or more, and is preferably 10 mm or less, more preferably 5 mm or less. Within the above range, this is suitable for improving the strength of a composite molded article. Also, the bead size of the expanded beads is an average value of values measured as maximum outer dimensions of at least 100 or more expanded beads.

Also, as for the expanded beads used in the present invention, not only single-layer expanded beads formed of only a foamed layer, but also expanded beads with a multi-layer structure may be used. Also, specific examples of the expanded beads with a multi-layer structure may include expanded beads formed of a foamed core layer, and a cover layer that covers the core layer. Also, the cover layer may be in a foamed state or a non-foamed state.

As for the above expanded beads with the multi-layer structure, for example, it is preferable to use a polylactic acid resin having a crystal structure, for the core layer, and it is also preferable to use a polylactic acid resin that is not crystallized or is hardly crystallized (hereinafter, collectively referred to as a low-crystalline polylactic acid-based resin), for the cover layer. Since the low-crystalline polylactic acid-based resin has a property of being easily dissolved or being easily swelled in a thermosetting resin, when the polylactic acid-based resin in the cover layer is low-crystalline, the affinity with a thermosetting resin liquid raw material becomes higher. On the other hand, since the polylactic acid-based resin having the crystal structure is hardly dissolved or hardly swelled in the thermosetting resin liquid raw material, when the polylactic acid resin in the core layer has the crystal structure, the shape of expanded beads is easily maintained. The polylactic acid-based resin-expanded beads as described above may be prepared by, for example, a method described in JP-A-2012-025869.

The bulk density of the expanded beads used in the composite molded article of the present invention is preferably 10 kg/m³ or more, more preferably 20 kg/m³ or more, and further more preferably 30 kg/m³ or more, and is preferably 250 kg/m³ or less, more preferably 200 kg/m³ or less, and further more preferably 150 kg/m³ or less. Within the above range, it is possible to obtain a composite molded article having a high weight-reduction effect and having a good expansion force by a compression step.

Also, the bulk density of the expanded beads may be found as follows. After filling a container such as a measuring cylinder with the expanded beads through free fall, the container is vibrated, and the bulk volume of the expanded beads is obtained by reading a scale when the volume reaches a constant amount. The bulk density of the expanded beads may be found by dividing the total weight of the expanded beads with which the container is filled by the bulk volume.

The weight (the bead weight) per expanded bead is preferably 0.1 mg or more, more preferably 0.5 mg or more, and further more preferably 0.8 mg or more from the viewpoint of maintaining a high closed cell ratio of the expanded beads, and is preferably 20 mg or less, and more preferably 5 mg or less.

Also, for the bead weight, an average bead weight is obtained by randomly selecting 100 beads, collectively measuring the weight of the 100 selected beads, and calculating a value when the measured weight is divided by 100.

Specific examples of suitable expanded beads used in the composite molded article of the present invention include a product name: "LACTIF (registered trademark)" manufactured by JSP Corporation, which is a polylactic acid-based resin foam, and among these, expanded beads having a bulk density of 15 to 200 g/L, and the like are preferably exemplified. Further, it is also possible to use the expanded beads obtained with reference to JP-B-53-1313, WO2012/086305, JP-A-2012-025869, and the like.

[Method of Producing Composite Molded Article]

The composite molded article of the present invention is preferably obtained by a production method having the following steps. First, an expanded bead mixture containing thermoplastic resin expanded beads and an uncured thermosetting resin raw material as a raw material of a thermosetting resin binder is placed in a mold. Next, after or when the expanded bead mixture is compressed at least uniaxially direction in the mold, the expanded bead mixture is heated to cure a part of the uncured thermosetting resin raw material, thereby forming a composite molded article.

At this time, the thermosetting resin raw material in an uncured state that forms the thermosetting resin binder preferably contains the above-mentioned component that cures during heating and the component that does not cure. When the composite molded article is formed, the component that cures becomes the thermosetting resin (b) in a cured state in the thermosetting resin binder, and the component that does not cure becomes the thermosetting resin (a) in an uncured state in the thermosetting resin binder.

Then, since the expanded bead mixture is compression-heat-molded at a low temperature, the compressed state is easily preserved by the thermosetting resin in a cured state in the thermosetting resin binder. Further, when cooled after compression molding, the fluidity of the thermosetting resin in an uncured state decreases, and a composite molded article in which the compressed state is preserved is formed. The uncured thermosetting resin, which is the raw material of the thermosetting resin binder, softens when heated. However, since the composite molded article is not reheated and does not re-expand until the composite molded article is reheat-molded, the composite molded article can be stored as a molded article that maintains a stable shape. In a first compression and heat-molding step, the expanded bead mixture is heated and compressed to obtain the composite molded article of the present invention, which is an initial molded article in which the compressed shape is maintained.

By laminating a sheet material on the composite molded article of the present invention and performing a molding operation at the reheating temperature, the thermosetting resin in an uncured state, which is the raw material of the thermosetting resin binder, is reheated and softened. Then, the restoring force of the expanded beads suppressed by the compression is released, and the composite molded article expands. In this way, the composite molded article and the sheet material are bonded to each other, and a laminate described later can be obtained.

The method of producing a composite molded article of the present invention preferably includes a step 1 in which an expanded bead mixture containing thermoplastic resin expanded beads, and a thermosetting resin binder containing an epoxy compound, an amine compound and an imidazole compound is placed in a mold, compressed, heated and molded.

Hereinafter, a preferred embodiment of the method of producing the composite molded article of the present invention will be described.

(Expanded Bead Mixture)

The expanded bead mixture contains thermoplastic resin expanded beads and, as a thermosetting resin binder, an epoxy compound, an amine compound and an imidazole compound.

The expanded bead mixture is obtained by the following method. First, an epoxy compound, an amine compound and an imidazole compound are mixed by stirring or the like to prepare an epoxy resin raw material mixture.

Next, the expanded beads are mixed with the epoxy resin raw material mixture, or the epoxy resin raw material mixture is applied on the expanded beads, whereby the surface of the expanded beads are coated with the epoxy resin raw material mixture to form a covered product in which the expanded beads are covered (coated) with the thermosetting resin binder. Also, it is preferable that the expanded beads are mixed with the epoxy resin raw material mixture by using a batch type mixer such as a Ploughshare mixer and a Henschel mixer, or a continuous mixer such as a mono pump and a screw pump such that the expanded beads are not cut or destructed, etc. during mixing. Also, the raw material mixture may contain reinforcing fibers.

When the composite molded article contains reinforcing fibers, the covered product in which the expanded beads are covered with the thermosetting resin binder may be mixed with the reinforcing fibers. In the covered product, the thermosetting resin binder covering the expanded beads is in an uncured state. When the covered product is mixed with the reinforcing fibers, the reinforcing fibers adhere to the epoxy resin raw material mixture covering the surface of the expanded beads. Then, by allowing the reinforcing fibers to be present in the thermosetting resin binder, the reinforcing fibers can be contained on the surface side of the thermosetting resin expanded beads. By adhering the reinforcing fibers in a subsequent step to the covered product of expanded beads covered with the epoxy resin raw material mixture, the reinforcing fibers are unevenly distributed on the outmost surface of the covered product of expanded beads. As a result, the fluidity of the obtained expanded bead mixture can be improved.

In this way, it is possible to obtain a particulate expanded bead mixture, the surface of which is covered with an epoxy resin in an uncured state.

The average bead size of the particulate expanded bead mixture is preferably 1 mm or more, more preferably 2 mm or more, and is preferably 10 mm or less, more preferably 6 mm or less, and further more preferably 5 mm or less, from the viewpoint of freely setting the shape of the composite molded article by filling a mold with the expanded bead mixture.

The bulk density of the expanded bead mixture is preferably 30 kg/m$^3$ or more, more preferably 40 kg/m$^3$ or more, and further more preferably 45 kg/m$^3$ or more, and is preferably 500 kg/m$^3$ or less, more preferably 300 kg/m$^3$ or less, and further more preferably 100 kg/m$^3$ or less. Within the above range, the expanded bead mixture is excellent in lightness and also excellent in strength. The bulk density of the expanded bead mixture is measured by a method described in Examples to be described later.

(Step 1)

Step 1 is a step of placing the expanded bead mixture in a mold, subjecting the expanded bead mixture to compressing, heating and molding.

Specifically, after an openable and sealable mold is filled with the expanded bead mixture, the mold is closed, pressurized and compressed. Further, during the compression, the epoxy compound and the amine compound of the thermosetting resin are heated to an extent that they react and cure. Then, the expanded bead mixtures are bonded to each other, and a part of the thermosetting rein is fixed and molded in a compressed state.

In the thermosetting resin after molding in step 1, it is preferable that the fluidity is reduced (a semi-cured state) even a part of the thermosetting resins is in an uncured state at least in the standard state.

The mold used in the step may have a desired shape. However, it is preferable that the mold can be compressed at least in the uniaxial direction, and it is more preferable that the mold can be compressed only in the uniaxial direction.

For example, in the case of a mold in order to obtain a plate-shaped molded article, it is preferable that the mold can be compressed in a direction perpendicular to the widest surface (Z-axis direction, thickness direction).

The compression ratio is preferably 1.2 or more, more preferably 1.4 or more, further more preferably 1.7 or more, and still further more preferably 2.0 or more, and is preferably 5.0 or less.

When the compression rate is in the above range, the expansion rate is high and a composite molded article having an excellent bonding property can be obtained.

The compression ratio is obtained as the ratio of the volume in a state of being filled with the expanded beads to the volume of the composite molded article.

By heating in a compressed state under pressure, the epoxy compound and the amine compound of the thermosetting resin react and cure.

The heating in the step is preferably performed at 70° C. or lower. The heating temperature is more preferably 65° C. or lower, further more preferably 62° C. or lower, and still further more preferably 60° C. or lower, and the heating temperature is preferably room temperature or higher, more preferably 50° C. or higher, and further more preferably 55° C. or higher.

By setting the heating temperature within the above range, the thermosetting resin binder can be cured to such an extent that it has sufficient expansion force as a composite molded article, and the thermosetting resin binder can contain a thermosetting resin in an uncured state.

Specifically, by setting the heating temperature within the above range, the epoxy compound reacts with the amine compound that cures even at a low temperature to form a partially cured state. On the other hand, the remaining epoxy compound exists in an uncured state.

By removing the composite molded article from the mold after the reaction, cooling, and decompression, the fluidity of the thermosetting resin (a) in an uncured state is reduced, and the composite molded article will be able to retain a specific compressed state.

[Laminate and Production Method Thereof]

The laminate of the present invention is formed by bonding the aforementioned composite molded article and a sheet material.

That is, the laminate of the present invention is a composite molded article in which thermoplastic resin expanded beads are bonded via a thermosetting resin binder, wherein the composite molded article has a density of 0.05 to 0.5 g/cm³, when heated at 100° C. for 20 minutes, the composite molded article has an expansion rate of 10 to 100%, the thermosetting resin binder is obtained by bonding the composite molded article containing a thermosetting resin in an uncured state with a sheet material, and finally the thermosetting resin in the laminate is in a cured state.

As described above, the laminate of the present invention is a laminate in which the composite molded article and the sheet material are laminated and the thermosetting resin binder is cured.

The sheet material used in the laminate of the present invention is preferably a resin sheet generally used as a surface material.

The lower limit of the thickness of the sheet material is preferably 0.5 mm, more preferably 0.7 mm, and further more preferably 0.8 mm, and the upper limit of the thickness of the sheet material is preferably 5 mm, more preferably 4 mm, and further more preferably 3 mm.

Further, the sheet material is preferably a resin sheet composed of a thermoplastic resin, and the resin constituting the sheet material is more preferably composed of at least one selected from a group consisting of an acrylic resin, a PET resin, a PVC resin, a PP resin, a PE resin, an ABS resin, and a PS resin, and the ABS resin is further more preferable. In addition, the resin constituting the sheet material is preferably a resin having a functional group from the viewpoint of wettability to water.

The bonding surface between the sheet material and the composite molded article may have a bonding layer composed of an adhesive, but preferably does not have a bonding layer. Further, it is more preferable that the sheet material and the composite molded article are directly bonded to each other via a thermosetting resin.

By using the composite molded article of the present invention, it is possible to obtain a laminate having a uniform bonding surface with the sheet material, an excellent bonding property, and excellent smoothness without using an adhesive or the like.

The laminate of the present invention can be produced by laminating the composite molded article and the sheet material, curing the thermosetting resin binder, and bonding the composite molded article and the sheet material.

The method of producing a laminate preferably includes a step 2 in which the composite molded article and the sheet material are placed in a mold, heating is performed in a state where the composite molded article and the sheet material are laminated, and the composite molded article and the sheet material are bonded to each other.

In step 2, the heating is performed to first impart fluidity to the thermosetting resin (a) in an uncured state constituting the thermosetting resin binder, and the composite molded article expands as the compressed state of the composite molded article is released. As a result, the composite molded article can be expanded according to the unevenness of the mold, and the bonding surface between the sheet material and the composite molded article can be uniformly pressed so that the sheet material and the composite molded article are brought into close contact with each other. Further heating cures the thermosetting resin binder. As a result, the obtained laminate can be obtained in a shape that conforms to the shape of the mold without uneven adhesion between the sheet material and the composite molded article. Further, the laminate has smoothness and an appearance conforming to an excellent surface shape.

When an epoxy resin is used in the thermosetting resin binder, the imidazole-based compound that did not react in step 1 when producing the composite molded article reacts in step 2, and thus it is possible to obtain a laminate in which the thermosetting resin binder is in a cured state.

The heating temperature in step 2 is preferably 75° C. or higher, more preferably 80° C. or higher, and further more preferably 90° C. or higher, and the upper limit is preferably 150° C. or lower, more preferably 120° C. or lower. The heating rate of the surface of the composite molded article is preferably 5 to 500° C./min.

In step 2, heating may be performed in two stages, and it is preferable to perform heating in two stages from the viewpoint of smoothness.

That is, in the first stage of heating, the thermosetting resin binder is imparted with fluidity, and the composite molded article is released from the compressed state and expanded. In addition, in the second stage of heating, the thermosetting resin binder is cured. By heating in two stages in this way, it is possible to take a sufficient time for the composite molded article to expand, and thus the obtained laminate has no surface unevenness due to heating and has a smoother surface.

When heating is performed in two stages, the heating temperature in the first stage is preferably 55° C. or higher, more preferably 60° C. or higher, and further more preferably 70° C. or higher, and the upper limit is preferably 80° C. or lower, more preferably 75° C. or lower.

The heating temperature in the second stage is preferably 75° C. or higher, more preferably 80° C. or higher, and further more preferably 90° C. or higher, and the upper limit is preferably 150° C. or lower, more preferably 120° C. or lower.

These temperatures can be appropriately selected depending on the thermosetting resin and the curing agent used.

Since the laminate of the present invention has excellent surface smoothness and an excellent bonding property between the foamed resin and the sheet material, it is usefully used in automobile interior materials and structural materials such as building members.

EXAMPLES

Next, the present invention will be described by Examples in more detail, but the present invention is not limited by these examples at all.

[Measurement/Evaluation]

(Bulk Density of Expanded Bead Mixture)

The measurement of the bulk density of the expanded bead mixture was performed on the expanded bead mixture that had been air-dried all day and night. After air-drying, the expanded bead mixture was measured by being filled into a 1 L measuring cylinder up to the 1 L mark line position, and then the mass $W_P$ (unit: g) of the expanded bead mixture with a bulk volume of 1 L was weighed to the first decimal place. Then, the bulk density (unit: kg/m³) was found by performing unit conversion.

(Cured State of Thermosetting Resin Binder of Expanded Bead Mixture)

In a method of determining the uncured state of the thermosetting resin binder of the expanded bead mixture, in accordance with a heat flux differential scanning calorimetry method described in JIS K7122-1987, a DSC curve was obtained by increasing the temperature of 1 to 4 mg of the expanded bead mixture from 0° C. to 200° C. at a rate of 10° C./min. Here, a case where a curing heat generation peak derived from the thermosetting resin binder was checked was determined as an uncured state.

(Expansion Test)

For the composite molded articles obtained in Examples and Comparative Examples, the volumes thereof were measured after heating at 100° C. for 20 minutes, divided by the volumes before heating, expressed as percentages, and subtracted by 100 to obtain volume expansion rates (%).

When the composite molded article has a rectangular parallelepiped shape, the Z-axis direction is the thickness direction (the direction perpendicular to the surface having the largest area, the height direction, the thickness of the composite molded article: about 20 mm), the X-axis direction is perpendicular to the thickness direction and is the length direction of one surface (width direction, the thickness of the composite molded article: about 100 mm), and the Y-axis direction is the direction orthogonal to the Z-axis and the X-axis, and is the length direction of one surface (depth direction, the thickness of the composite molded article: about 100 mm).

For the composite molded articles obtained in Examples and Comparative Examples, the thicknesses in each axial direction were measured after heating at 100° C. for 20 minutes, divided by the thicknesses before heating, expressed as percentages, and subtracted by 100 to obtain the expansion rate (%) in each axial direction.

(Sheet Bonding Property)

From the laminates obtained in Examples and Comparative Examples, the upper and lower surfaces (ABS resin sheet) of a rectangular parallelepiped shaped expanded bead molded article test piece containing an ABS resin sheet on one side of length 50 mm and width 50 mm (length 50 mm, width 50 mm, thickness 20 mm) were fixed to a peeling strength measuring tool with an adhesive, and a tensile test was conducted by peeling the sheet at a tensile speed of 2 mm/min using a Tensilon universal tester. The higher the material destruction rate when peeled off, the better the sheet bonding property.

The evaluation criteria are as follows.

A: The material destruction rate when peeled off is 60% or more

B: The material destruction rate when peeled off is 40% or more and less than 60%

C: The material destruction rate when peeled off is less than 40%

(Smoothness)

The maximum height roughness (Rz) of the surface of the laminate obtained in Examples and Comparative Examples in which the composite molded article had a rectangular parallelepiped shape and the sheet materials were laminated in the thickness direction thereof was measured.

As for the maximum height roughness (Rz), the maximum height roughness Rz (μm) of the roughness curve element according to JIS B0601: 2013 was measured at 10 points. As the measuring device, SE1700a of a surf coder manufactured by Kosaka Laboratory Ltd. was used. The smaller the maximum height roughness, the better the smoothness.

The evaluation criteria are as follows.

A: The maximum height roughness (Rz) is less than 50 μm

B: The maximum height roughness (Rz) is 50 μm or more

[Production of Expanded Bead Mixture]

Production Example 1

In a polypropylene beaker with an internal volume of 200 mL, an epoxy compound (manufactured by DIC Corporation, trade name "Epicron850", a bisphenol A-type epoxy resin), an amine compound (1,3-bis(aminomethyl)cyclohexane, an amine-based curing agent, manufactured by Mitsubishi Gas Chemical Company, trade name "1,3-BAC"), and an imidazole compound (2-ethyl-4-methylimidazole, an imidazole-based curing agent, manufactured by Shikoku Chemicals Corporation, trade name "2E4MZ") were respectively weighed in the amounts shown in Table 1 and stirred to prepare a resin mixture.

Next, polylactic acid-based resin expanded beads (foaming ratio 30 times, manufactured by JSP Corporation, trade name "LACTIF") in an amount shown in Table 1 were put into a polyethylene bag with a maximum internal volume of about 20 L, and the resin mixture was added and mixed such that the surface of the expanded beads was uniformly coated with the resin mixture to obtain a particulate expanded bead mixture 1.

The bulk density of the obtained expanded bead mixture is shown in Table 1. Further, it was determined by DSC measurement that the thermosetting resin binder contained a thermosetting resin in an uncured state.

Production Example 2

A particulate expanded bead mixture 2 was obtained in the same manner as in Production Example 1 except that the amounts of the epoxy compound and the amine compound each were changed to the amounts shown in Table 1 without using the imidazole compound. The bulk density of the obtained expanded bead mixture is shown in Table 1. Also, it was determined by DSC measurement that the thermosetting resin binder contained a thermosetting resin in an uncured state.

Production Example 3

A particulate expanded bead mixture 3 was obtained in the same manner as in Production Example 1 except that the amounts of the epoxy compound, the amine compound, and the imidazole compound each were changed to the amounts shown in Table 1, and the polylactic acid-based resin expanded beads was changed from "LACTIF" with a foaming ratio of 30 times to "LACTIF" with a foaming ratio of 35 times. The bulk density of the obtained expanded bead mixture is shown in Table 1. Also, it was determined by DSC measurement that the thermosetting resin binder contained a thermosetting resin in an uncured state.

Production Example 4

A particulate expanded bead mixture 4 was obtained in the same manner as in Production Example 3 except that the amounts of the epoxy compound and the amine compound each were changed to the amounts shown in Table 1 without using the imidazole compound. The bulk density of the obtained expanded bead mixture is shown in Table 1. Also, it was determined by DSC measurement that the thermosetting resin binder contained a thermosetting resin in an uncured state.

TABLE 1

|  |  |  | Prod. Ex. 1 | Prod. Ex. 2 | Prod. Ex. 3 | Prod. Ex. 4 |
|---|---|---|---|---|---|---|
| Expanded bead mixture |  |  | 1 | 2 | 3 | 4 |
| Thermoplastic resin expanded beads (part by mass) | Polylactic acid-based resin expanded beads | LACTIF | 100 | 100 | 100 | 100 |
|  |  | Bulk density (kg/m$^3$) | 42 | 42 | 36 | 36 |
| Thermosetting resin binder (part by mass) | Epoxy compound | Epicron850 | 22.2 | 21.0 | 22.2 | 22.2 |
|  | Amine compound | 1,3-BAC | 2.1 | 4.0 | 4.2 | 4.2 |
|  | Imidazole compound | 2E4MZ | 0.67 | — | 0.70 | — |
|  | Content (%) |  | 20.0 | 20.0 | 20.0 | 20.0 |
| Bulk density (kg/m$^3$) |  |  | 45 | 45 | 43 | 45 |

Production Examples 5 to 8

Particulate expanded bead mixtures 5 to 8 were obtained in the same manner as in Production Example 3 except that the amounts of the epoxy compound, the amine compound, and the imidazole compound each were changed to the amounts shown in Table 2. The bulk density of the expanded bead mixture obtained in each production example is shown in Table 2. Also, it was determined by DSC measurement that the thermosetting resin binder of each production example contained a thermosetting resin in an uncured state.

Production Examples 9 to 13

Particulate expanded bead mixtures 9 to 13 were obtained in the same manner as in Production Example 3 except that the type of the epoxy compound was changed from "Epicron850" (trade name, manufactured by DIC Corporation) to "jER604" (trade name, manufactured by Mitsubishi Chemical Corporation), and the amounts of the epoxy compound, the amine compound, and the imidazole compound each were changed to the amounts shown in Table 2. The bulk density of the expanded bead mixture obtained in each production example is shown in Table 2. Also, it was determined by DSC measurement that the thermosetting resin binder of each production example contained a thermosetting resin in an uncured state.

Production Example 14

In a polypropylene beaker with an internal volume of 200 mL, an epoxy resin (manufactured by Mitsubishi Chemical Corporation, trade name "jER604"), an amine-based curing agent (1,3-bis(aminomethyl)cyclohexane, manufactured by Mitsubishi Gas Chemical Company, trade name "1,3-BAC"), an imidazole-based curing agent (2-ethyl-4-methylimidazole, manufactured by Shikoku Chemicals Corporation, trade name "2E4MZ"), and a dispersant (manufactured by BYK Company, trade name "BYK-9076") were respectively weighed in the amounts shown in Table 2 and stirred to prepare a resin mixture.

Next, polylactic acid-based resin expanded beads (foaming ratio 35 times, manufactured by JSP Corporation, trade name "LACTIF") in an amount shown in Table 2 were put into a polyethylene bag with a maximum internal volume of about 20 L, and the resin mixture was added and mixed such that the surface of the expanded beads was uniformly coated with the resin mixture.

Next, carbon fibers (manufactured by Zoltek Corporation, trade name "RMF150") in an amount shown in Table 2 were divided into two portions, put into a polyethylene bag, and mixed. Carbon fibers that did not adhere to the beads were removed from the obtained particulate matter using a metal mesh (manufactured by Tokyo Screen Co., Ltd.) having an opening of 2 mm.

As a result of the above operations, a particulate expanded bead mixture 14 was obtained.

The bulk density of the obtained expanded bead mixture is shown in Table 2. Further, it was determined by DSC measurement that the thermosetting resin binder contained a thermosetting resin in an uncured state.

Production Example 15

A particulate expanded bead mixture 15 was obtained in the same manner as in Production Example 14 except that the amounts of the epoxy compound, the amine compound, the imidazole compound, the dispersant, and the carbon fibers each were changed to the amounts shown in Table 2, and the polylactic acid-based resin expanded beads was changed from "LACTIF" with a foaming ratio of 35 times to "LACTIF" with a foaming ratio of 30 times. The bulk density of the obtained expanded bead mixture is shown in Table 2. Also, it was determined by DSC measurement that the thermosetting resin binder contained a thermosetting resin in an uncured state.

TABLE 2

|  |  |  | Prod. Ex. 5 | Prod. Ex. 6 | Prod. Ex. 7 | Prod. Ex. 8 | Prod. Ex. 9 | Prod. Ex. 10 | Prod. Ex. 11 | Prod. Ex. 12 | Prod. Ex. 13 | Prod. Ex. 14 | Prod. Ex. 15 |
|---|---|---|---|---|---|---|---|---|---|---|---|---|---|
| Expanded bead mixture |  |  | 5 | 6 | 7 | 8 | 9 | 10 | 11 | 12 | 13 | 14 | 15 |
| Thermoplastic resin expanded beads (part by mass) | Polylactic acid-based resin expanded beads | LACTIF | 100 | 100 | 100 | 100 | 100 | 100 | 100 | 100 | 100 | 100 | 100 |
|  |  | Bulk density (kg/m$^3$) | 36 | 36 | 36 | 36 | 36 | 36 | 36 | 36 | 36 | 36 | 42 |

TABLE 2-continued

|  |  |  | Prod. Ex. 5 | Prod. Ex. 6 | Prod. Ex. 7 | Prod. Ex. 8 | Prod. Ex. 9 | Prod. Ex. 10 | Prod. Ex. 11 | Prod. Ex. 12 | Prod. Ex. 13 | Prod. Ex. 14 | Prod. Ex. 15 |
|---|---|---|---|---|---|---|---|---|---|---|---|---|---|
| Thermo-setting resin binder (part by mass) | Epoxy compound | Epicron850 | 22.2 | 22.2 | 22.2 | 22.2 | — | — | — | — | — | — | — |
| | | jER604 | — | — | — | — | 17.3 | 17.3 | 17.3 | 17.3 | 17.3 | 60.7 | 17.3 |
| | Amine compound | 1,3-BAC | 3.0 | 2.1 | 1.3 | 0.9 | 5.1 | 3.6 | 2.6 | 1.5 | 1.0 | 9.0 | 2.6 |
| | Imidazole compound | 2E4MZ | 0.70 | 0.70 | 0.70 | 0.70 | 0.34 | 0.34 | 0.34 | 0.34 | 0.34 | 1.21 | 0.35 |
| | Content (%) | | 20.0 | 20.0 | 20.0 | 20.0 | 20.0 | 20.0 | 20.0 | 20.0 | 20.0 | 27.1 | 13.8 |
| Reinforcing fiber (part by mass) | Carbon fiber | RMF150 | — | — | — | — | — | — | — | — | — | 89.0 | 25.3 |
| | Dispersant | BYK-9076 | — | — | — | — | — | — | — | — | — | 1.8 | 0.5 |
| Bulk density (kg/m$^3$) | | | 43 | 43 | 43 | 43 | 42 | 44 | 43 | 44 | 43 | 70 | 47 |

[Production of Composite Molded Article]

Example 1

The expanded bead mixture 1 obtained in Production Example 1 was filled in a mold adjusted to the molding temperature shown in Table 3, compression molded at the temperature for 10 minutes, cooled to room temperature, depressurized, and then removed from the mold to obtain a composite molded article having a size of 100 mm×100 mm×20 mm. The mold can be sealed, and at the time of molding, it was compressed in the thickness direction (the plate thickness direction, the direction perpendicular to the widest surface) at the compression rate shown in Table 3. The compression rate was calculated as the ratio of the volume in a state of being filled with the expanded beads to the volume of the composite molded article.

The expansibility of the composite molded article obtained in Example 1 was evaluated. The results are shown in Table 3.

Examples 2 to 16 and Comparative Examples 1 to 3

The expanded bead mixtures 1 to 15 obtained in Production Examples 1 to 15 each were filled in a mold adjusted to the molding temperature shown in Tables 3 and 4 in the same manner as in Example 1, compression molded at the temperature for 10 minutes, cooled to room temperature, depressurized, and then removed from the mold to obtain composite molded articles having a size of 100 mm×100 mm×20 mm. The mold can be sealed, and at the time of molding, it was compressed in the thickness direction (the plate thickness direction, the direction perpendicular to the widest surface) at the compression rate shown in Tables 3 and 4. The compression rate was calculated as the ratio of the volume in a state of being filled with the expanded beads to the volume of the composite molded article.

The expansibility of the composite molded articles obtained in Examples and Comparative Examples was evaluated. The results are shown in Tables 3 and 4.

[Production of Laminate]

Examples 17 to 32 and Comparative Examples 4 to 6

The composite molded articles obtained in the above Examples and Comparative Examples each were placed in a 100 mm×100 mm×20 mm mold with an ABS resin sheet placed on one side of the composite molded article, mold clamped, and then heated to the reheating temperatures shown in Tables 3 and 4, maintained at those temperatures for 10 minutes, then standing to cooled to room temperature, and then taken out from the mold to obtain laminates.

The sheet bonding property and smoothness of the obtained laminates were evaluated. The results are shown in Tables 3 and 4.

TABLE 3

| Composite molded article | | Ex. 1 | Ex. 2 | Ex. 3 | Comp. Ex. 1 | Comp. Ex. 2 | Ex. 4 | Comp. Ex. 3 |
|---|---|---|---|---|---|---|---|---|
| Expanded bead mixture No. | | 1 | 1 | 1 | 1 | 2 | 3 | 4 |
| Molding condition | Compression rate (times) | 1.2 | 1.5 | 2.0 | 1.0 | 2.0 | 2.0 | 1.1 |
| | Molding temperature (° C.) | 60 | 60 | 60 | 60 | 60 | 60 | 60 |
| Composite molded article | Weight (g) | 21.0 | 23.7 | 28.2 | 29.2 | 58.3 | 27.4 | 60.1 |
| | Density (kg/m$^3$) | 105 | 119 | 141 | 146 | 291 | 137 | 301 |
| Expansibility test (%) | Volume expansion rate | 17.8 | 36.0 | 38.7 | 1.0 | 7.2 | 30.9 | 9.9 |
| | Expansion rate in X-axis direction | 3.0 | 3.0 | 4.0 | 0.0 | 2.0 | 2.6 | 1.2 |
| | Expansion rate in Y-axis direction | 3.0 | 4.0 | 3.0 | 0.0 | 2.0 | 3.0 | 2.7 |
| | Expansion rate in Z-axis direction | 11.0 | 27.0 | 29.5 | 1.0 | 3.0 | 24.0 | 5.7 |

TABLE 3-continued

| Laminate | | Ex. 17 | Ex. 18 | Ex. 19 | Comp. Ex. 4 | Comp. Ex. 5 | Ex. 20 | Comp. Ex. 6 |
|---|---|---|---|---|---|---|---|---|
| | Reheating temperature (° C.) | 100 | 100 | 100 | 100 | 100 | 100 | 100 |
| Laminate evaluation | Sheet bonding property | A | A | A | C | C | B | C |
| | Smoothness | A | A | A | B | B | A | A |

TABLE 4

| Composite molded article | | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|
| Expanded bead mixture No. | | 5 | 6 | 7 | 8 | 9 | 10 | 11 | 12 | 13 | 14 | 15 | 15 |
| Molding condition | Compression rate (times) | 2.0 | 2.0 | 2.0 | 2.0 | 2.0 | 2.0 | 2.0 | 2.0 | 2.0 | 2.0 | 2.0 | 3.0 |
| | Molding temperature (° C.) | 60 | 60 | 60 | 60 | 60 | 60 | 60 | 60 | 60 | 60 | 60 | 60 |
| Composite molded article | Weight (g) | 27.4 | 27.4 | 27.4 | 27.4 | 38.0 | 27.1 | 27.6 | 27.4 | 27.9 | 27.4 | 29.0 | 35.6 |
| | Density (kg/m³) | 137 | 137 | 137 | 137 | 190 | 136 | 138 | 137 | 139 | 137 | 145 | 178 |
| Expansibility test (%) | Volume expansion rate | 34.1 | 42.8 | 126.7 | 184.5 | 15.9 | 26.0 | 32.0 | 33.9 | 43.9 | 62.8 | 24.8 | 30.1 |
| | Expansion rate in X-axis direction | 2.9 | 3.7 | 14.5 | 16.2 | 2.0 | 1.8 | 2.2 | 2.3 | 3.0 | 6.1 | 2.0 | 2.0 |
| | Expansion rate in Y-axis direction | 2.2 | 3.9 | 13.6 | 16.9 | 2.0 | 1.4 | 2.1 | 2.1 | 3.1 | 5.7 | 2.0 | 2.0 |
| | Expansion rate in Z-axis direction | 27.4 | 32.6 | 74.2 | 109.4 | 11.0 | 22.0 | 26.5 | 28.2 | 35.6 | 45.2 | 20.0 | 25.0 |
| Laminate | | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex. 32 |
| Reheating temperature (° C.) | | 100 | 100 | 100 | 100 | 100 | 100 | 100 | 100 | 100 | 100 | 100 | 100 |
| Laminate evaluation | Sheet bonding property | B | B | A | A | A | B | B | A | A | A | A | A |
| | Smoothness | A | A | A | A | A | A | A | A | A | A | A | A |

As is clear from Tables 3 and 4, it can be seen that the laminates produced by using the composite molded articles of the Examples have an excellent bonding property to the sheet materials. Moreover, it can be seen that the smoothness is also excellent.

It is considered that the expansion rates at the time of reheating are different because the compression rates of Examples 2 and 3 are different from that of Example 1 when forming the composite molded article.

Examples 5 to 8 are examples in which the amount of the amine compound added was changed with respect to Example 4, and composite molded articles having different expansion rates were obtained.

Examples 9 to 13 are examples in which other epoxy compounds were used as the thermosetting resin binder with respect to Examples 4 to 8.

Examples 9 to 13 are examples in which the amount of the amine compound added was changed, and composite molded articles having different expansion rates were obtained. Examples 14 to 16 are examples in which carbon fibers were added as reinforcing fibers.

The invention claimed is:

1. A composite molded article in which thermoplastic resin expanded beads are bonded via a thermosetting resin binder, wherein
the composite molded article has a density of 0.05 to 0.5 g/cm³, and
when heated at 100° C. for 20 minutes, the composite molded article has a volume expansion rate of 15 to 200%.

2. The composite molded article according to claim 1, wherein the thermosetting resin binder comprises a thermosetting resin (a) in an uncured state and a thermosetting resin (b) in a cured state.

3. The composite molded article according to claim 2, wherein the thermosetting resin (a) in an uncured state of the thermosetting resin binder comprises an epoxy compound and an imidazole compound.

4. The composite molded article according to claim 2, wherein the thermosetting resin (b) in a cured state of the thermosetting resin binder comprises a reaction product of an epoxy compound and an amine compound.

5. The composite molded article according to claim 2, wherein a mass ratio (a/b) of the thermosetting resin (a) in an uncured state of the thermosetting resin binder to the thermosetting resin (b) in a cured state of the thermosetting resin binder is 0.03 to 2.

6. The composite molded article according to claim 1, wherein a reinforcing fiber is further blended with the thermosetting resin binder.

7. The composite molded article according to claim 1, wherein the thermosetting resin binder of the composite molded article has a content of 15 to 70% by mass.

8. The composite molded article according to claim 1, wherein a thermoplastic resin constituting the expanded beads is an aliphatic polyester-based resin.

9. The composite molded article according to claim 1, wherein, of the volume expansion rate of the composite molded article when heated at 100° C. for 20 minutes, an expansion rate in a uniaxial direction is 50% or more of a total expansion rate.

* * * * *